(12) United States Patent
Kim et al.

(10) Patent No.: US 9,735,861 B2
(45) Date of Patent: Aug. 15, 2017

(54) APPARATUS AND METHOD FOR PROCESSING BLUETOOTH DATA IN PORTABLE TERMINAL

(71) Applicant: Samsung Electronics Co., Ltd., Suwon-si, Gyeonggi-do (KR)

(72) Inventors: Hyeong-Seok Kim, Seoul (KR); Hyuk Kang, Yongin-si (KR); Hyun-Chul Choi, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 119 days.

(21) Appl. No.: 14/167,387

(22) Filed: Jan. 29, 2014

(65) Prior Publication Data
US 2014/0213189 A1 Jul. 31, 2014

(30) Foreign Application Priority Data
Jan. 31, 2013 (KR) .......................... 10-2013-0011360

(51) Int. Cl.
H04B 7/26 (2006.01)
H04M 1/725 (2006.01)
H04W 52/02 (2009.01)

(52) U.S. Cl.
CPC ............ *H04B 7/26* (2013.01); *H04M 1/7253* (2013.01); *H04W 52/0225* (2013.01); *H04M 2250/02* (2013.01); *Y02B 60/50* (2013.01)

(58) Field of Classification Search
CPC .............................. H04B 7/26; A61B 5/04325
See application file for complete search history.

(56) References Cited

U.S. PATENT DOCUMENTS

| 2002/0017567 A1* | 2/2002 | Connolly ............... G04B 47/00 235/472.02 |
| 2005/0113647 A1* | 5/2005 | Lee ....................... A61B 5/0031 600/300 |
| 2006/0111062 A1* | 5/2006 | Cunningham .... H04W 52/0225 455/152.1 |
| 2008/0118014 A1 | 5/2008 | Reunamaki et al. |
| 2009/0276646 A1* | 11/2009 | Woo ..................... H04W 76/046 713/310 |
| 2010/0005294 A1* | 1/2010 | Kostiainen ......... H04B 10/1143 713/168 |
| 2012/0003932 A1 | 1/2012 | Zhodzishsky |

(Continued)

FOREIGN PATENT DOCUMENTS

WO 2008-020223 A1 2/2008

OTHER PUBLICATIONS

Joe Decuir, Bluetooth 4.0: Low Energy, Jun. 30, 2010.

*Primary Examiner* — Cindy Trandai
(74) *Attorney, Agent, or Firm* — Jefferson IP Law, LLP

(57) ABSTRACT

An apparatus and a method for processing Bluetooth data in a portable terminal are provided. The apparatus includes a first control unit for transmitting a predetermined data transmission condition, a second control unit for receiving and storing the data transmission condition, for determining whether the data transmission condition is satisfied when data is received from an accessory through Bluetooth communication, and for transmitting the received data to the first control unit when the data transmission condition is satisfied as a result of the determination.

19 Claims, 8 Drawing Sheets

(56) References Cited

U.S. PATENT DOCUMENTS

| | | | | |
|---|---|---|---|---|
| 2012/0142271 A1* | 6/2012 | Zhodzishsky | ........... | H04L 69/32 455/41.2 |
| 2012/0213136 A1* | 8/2012 | Woo | ...................... | G06F 1/3209 370/311 |
| 2013/0274565 A1* | 10/2013 | Langer | ................. | A61N 1/3993 600/301 |
| 2016/0095060 A1* | 3/2016 | Seddighrad | ........... | H04W 4/008 370/311 |

* cited by examiner

APPARATUS AND METHOD FOR PROCESSING BLUETOOTH DATA IN PORTABLE TERMINAL

PRIORITY

This application claims the benefit under 35 U.S.C. §119(a) of a Korean patent application filed on Jan. 31, 2013 in the Korean Intellectual Property Office and assigned Serial No. 10-2013-0011360, the entire disclosure of which is hereby incorporated by reference.

BACKGROUND OF THE INVENTION

1. Field of the Invention

The present invention relates to a portable terminal. More particularly, the present invention relates to an apparatus and a method for processing Bluetooth data in a portable terminal.

2. Description of the Related Art

Portable terminals such as smart phones and tablets provide users with various useful functions through various applications. Accordingly, the portable terminals have been developed to be capable of using voice communication and to communicate various additional types of information by providing various functions. Particularly, the various functions provided by the portable terminal include a function of performing Bluetooth communication with an accessory.

The accessory periodically transmits data to the portable terminal through the Bluetooth communication. The portable terminal receives the data through a Bluetooth unit thereof, and processes the received data through a control unit thereof, even when the control unit of the portable terminal has entered a sleep mode. A "wake-up" of the control unit is thus often necessary for data processing, which results in an increased current consumption of a battery.

Therefore, a need exists for a method and apparatus capable of minimizing current consumption by a portable terminal using Bluetooth communication.

The above information is presented as background information only to assist with an understanding of the present disclosure. No determination has been made, and no assertion is made, as to whether any of the above might be applicable as prior art with regard to the present invention.

SUMMARY OF THE INVENTION

Aspects of the present invention are to address at least the above-mentioned problems and/or disadvantages and to provide at least the advantages described below. Accordingly, an aspect the present invention is to provide an apparatus and a method for processing Bluetooth data in a portable terminal, by which an auxiliary control unit transmits data received from an accessory to a control unit according to a predetermined data transmission condition during Bluetooth communication so that current consumption of the control unit for data processing is minimized.

In accordance with an aspect of the present invention, an apparatus for processing Bluetooth data in a portable terminal is provided. The apparatus includes a first control unit for transmitting a predetermined data transmission condition, and a second control unit for receiving and storing the data transmission condition, for determining whether the data transmission condition is satisfied when data is received from an accessory through Bluetooth communication, and for transmitting the received data to the first control unit when the data transmission condition is satisfied as a result of the determination.

In accordance with another aspect of the present invention, a method for processing Bluetooth data in a portable terminal is provided. The method includes transmitting, by a first control unit, a predetermined data transmission condition, receiving and storing, by a second control unit, the data transmission condition, determining, by a second control unit, whether the data transmission condition is satisfied when data is received from an accessory through Bluetooth communication, and transmitting, by a second control unit, the received data to the first control unit when the data transmission condition is satisfied as a result of the determination.

In exemplary embodiments, present invention has an effect in which, when a portable terminal processes Bluetooth data, an auxiliary control unit transmits data received from an accessory to a control unit according to a predetermined data transmission condition during Bluetooth communication so that current consumption of the control unit for data processing may be minimized.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and advantages of certain exemplary embodiments of the present invention will be more apparent from the following description taken in conjunction with the accompanying drawings, in which.

Throughout the drawings, it should be noted that like reference numbers are used to depict the same or similar elements, features, and structures.

DETAILED DESCRIPTION OF EXEMPLARY EMBODIMENTS

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions may be omitted for clarity and conciseness.

A portable terminal according to exemplary embodiments of the present invention is a portable and movable electronic device, and may include a video phone, a cellular phone, a smart phone, an International Mobile Telecommunication 2000 (IMT-2000) terminal, a Wideband Code Division Multiple Access (WCDMA) terminal, a Universal Mobile Telecommunication Service (UMTS) terminal, a Personal Digital Assistant (PDA), a Portable Multimedia Player (PMP), a Digital Multimedia Broadcasting (DMB) terminal, an E-Book, a portable computer (a notebook, a tablet or the like), a digital camera, or the like.

Figure 1:
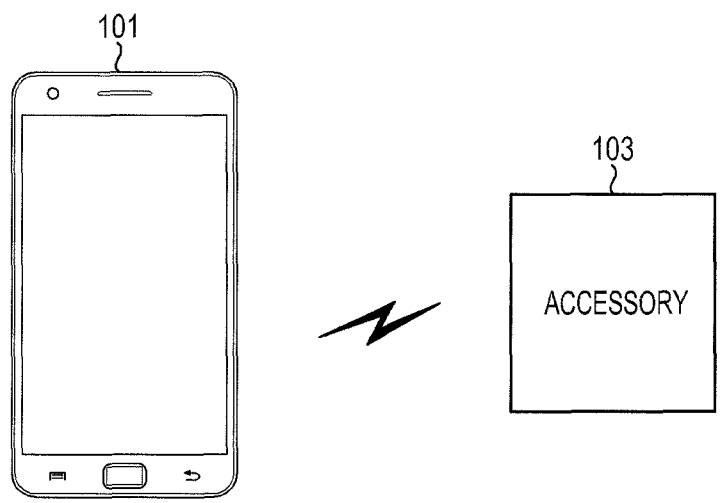
FIG. 1 illustrates a communication system according to an exemplary embodiment of the present invention.

FIG. 1 illustrates a communication system according to an exemplary embodiment of the present invention.

Referring to FIG. 1, the communication system includes a portable terminal 101 and an accessory 103.

The accessory 103 performs Bluetooth communication with the portable terminal 101, generates data related to functions provided by the accessory 103, and periodically transmits data to the portable terminal 101 through the Bluetooth communication. The accessory 103 may transmit data generated at a predetermined interval (for example, every one second) to the portable terminal 101. The accessory 103 is an apparatus capable of transmitting data to the portable terminal 101 using the Bluetooth communication.

In exemplary embodiments, the accessory 103 may include a heart rate monitor, a blood glucose monitor, a thermometer, an electrocardiogram meter, a pedometer, a smart phone having a temperature sensor or a barometer therein, or the like. The heart rate monitor measures a heart rate of a user to generate data including the measured heart rate, and transmits the generated data to the portable terminal 101. The blood glucose monitor measures blood glucose of a user to generate data including the measured blood glucose, and transmits the generated data to the portable terminal 101. The thermometer measures body temperature of a user to generate data including the measured body temperature, and transmits the generated data to the portable terminal 101. The electrocardiogram meter measures an electrocardiogram of a user to generate data including the measured electrocardiogram, and transmits the generated data to the portable terminal 101. The pedometer measures the number of steps of a user to generate data including the measured number of steps, and transmits the generated data to the portable terminal 101.

The Bluetooth communication supported by the portable terminal 101 and the accessory 103 may support the Bluetooth standard 4.0 or the Bluetooth Low Energy (BLE) technology. The Bluetooth low energy technology is a technology developed focusing on low energy application, and is different from the Bluetooth standards 1.0, 2.0, and 3.0. Exemplary embodiments of the present invention may also be used in the existing Bluetooth standards 1.0, 2.0, and 3.0, and will be described by employing the Bluetooth standard 4.0 or the Bluetooth Low Energy as an example for the purpose of convenience.

The portable terminal 101 performs the Bluetooth communication with the accessory 103, receives data from the accessory 103 through the Bluetooth communication, and processes the received data using an application related to the accessory 103.

In exemplary embodiments, when the accessory 103 is a heart rate monitor, the portable terminal 101 may receive data including a heart rate from the accessory 103 for storage, may detect the heart rate when an application related to the heart rate is executed, and may display the detected heart rate.

Hereinafter, with reference to FIG. 2 to FIG. 5, the elements of the portable terminal 101 will be described.

Figure 2:
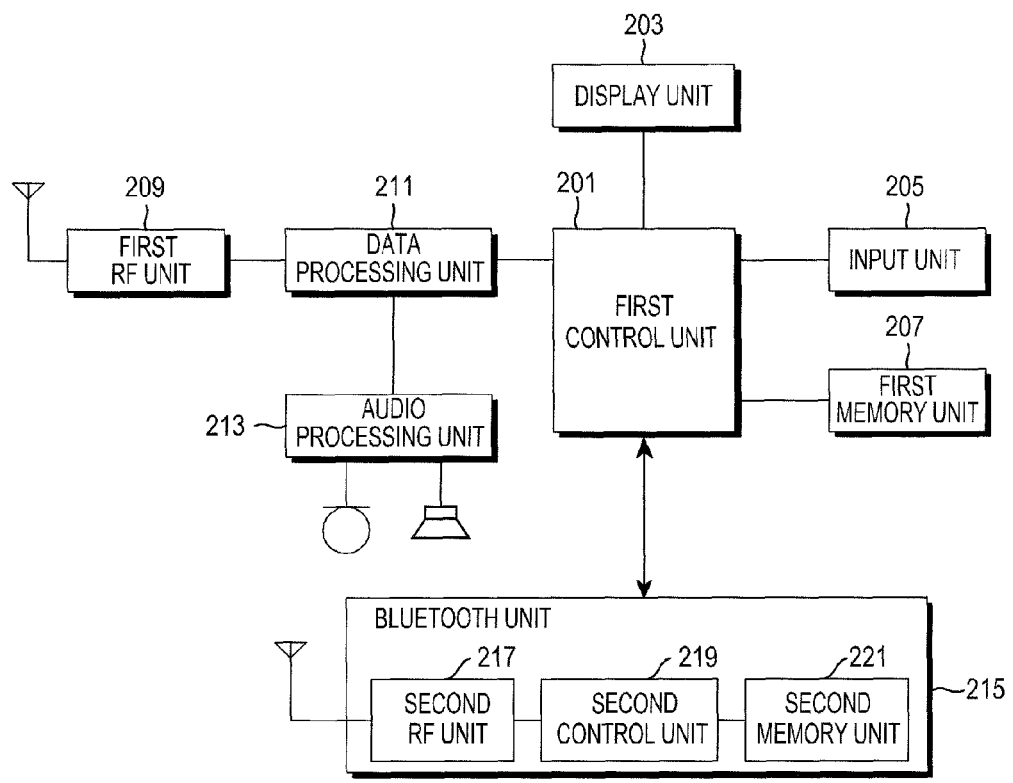
FIG. 2 illustrates a block configuration of a portable terminal according to a first exemplary embodiment of the present invention.

FIG. 2 illustrates a block configuration of a portable terminal according to a first exemplary embodiment of the present invention.

Referring to FIG. 2, the portable terminal 101 includes a first control unit 201, a display unit 203, an input unit 205, a first memory unit 207, a first radio Frequency (RF) unit 209, a data processing unit 211, an audio processing unit 213, and a Bluetooth unit 215.

The first RF unit 209 performs a wireless communication function of the portable terminal 101. In more detail, the first RF unit 209 may include a wireless transmitter for up-converting and amplifying a frequency of a transmitted signal, a wireless receiver for low-noise amplifying a received signal and down-converting a frequency of the received signal, or the like. The data processing unit 211 may include a transmitter for coding and modulating the transmitted signal, a receiver for demodulating and decoding the received signal, or the like. The data processing unit 211 may be configured by a modem, a codec, or the like, and the codec may include a data codec for processing packet data, or the like, and an audio codec for processing an audio signal such as voice.

The audio processing unit 213 performs functions of reproducing an audio signal output from the data processing unit 211, through a speaker, and transmitting an audio signal generated from a microphone to the data processing unit 211. The key input unit 205 includes keys for inputting numeral and character information and function keys for setting various functions. The display unit 203 displays a video signal on a screen and displays data requested to be output by the first control unit 201.

When the display unit 203 is provided with a capacitive or resistive touch display screen, the key input unit 205 may include only a minimum number of keys set in advance, and the display unit 203 may substitute for a part of the key input function of the key input unit 205.

The first memory unit 207 includes a program memory and a data memory. The program memory stores booting and Operating System (OS) for controlling a general operation of the portable terminal, and the data memory stores various types of data generated during the operation of the portable terminal. In exemplary embodiments, the first memory unit 207 may store a data transmission condition for transmitting data from the Bluetooth unit 215 to the first control unit 201.

The data transmission condition is a condition in which the Bluetooth unit 215 transmits data received from the accessory 103. The data transmission condition may be directly input by a user through the application related to the accessory 103, or may be selected by a user from a plurality of predetermined conditions. Furthermore, the data transmission condition may be set in advance. For example, when the portable terminal 101 connects to a heart rate monitor through the Bluetooth communication, the portable terminal 101 may set a preset reference condition corresponding to the heart rate monitor as the data transmission condition so that the data transmission condition may be automatically set without the selection or input operation of a user.

In exemplary embodiments, the data transmission condition may include a mode condition and a data processing condition of the first control unit 201. The mode condition of the first control unit 201 is a condition for transmitting data based on the mode of the first control unit 201. The mode condition of the first control unit 201 may include a first mode condition in which data is transmitted when the first control unit 201 is in an active mode, and a second mode condition in which, when the first control unit 201 is in a sleep mode, the mode of the first control unit 201 is switched from the sleep mode to the active mode and data is transmitted. The data processing condition is a condition in which data is transmitted based on a transmission interval of data received from the accessory 103 and information included in the data. The data processing condition may include at least one of a first processing condition in which accumulated data is transmitted at a predetermined transmission interval, a second processing condition in which data is transmitted when the information included in the data satisfies a predetermined reference, and a third processing condition obtained by combining the first processing condition with the second processing condition.

In exemplary embodiments, the first processing condition may be a condition in which data is transmitted every 10 seconds. When the accessory 103 is the heart rate monitor, the second processing condition may be a condition in which data is transmitted when a heart rate included in data is equal to or more than a predetermined reference value (for example, 120). When the accessory 103 is the heart rate monitor, the third processing condition may be a condition in which data is transmitted when an average value of heart rates received from the accessory 103 for 10 seconds is equal to or more than the predetermined reference value (for example, 120).

The first control unit 201 performs a function of controlling the overall operation of the portable terminal 101. In exemplary embodiments, after the application related to the accessory 103 is executed, the first control unit 201 may determine whether a data transmission condition menu is selected by a user. When the data transmission condition menu is selected, the first control unit 201 may display the first and second mode conditions and the first to third processing conditions.

In exemplary embodiments, when the accessory 103 is the heart rate monitor, the first control unit 201 may display, on a pop-up window, the first mode condition in which data is transmitted when the first control unit 201 is in the active mode, the second mode condition in which data is transmitted when the first control unit 201 is in a random mode, the first processing condition in which data is transmitted every 10 seconds, the second processing condition in which data is transmitted when a heart rate is equal to or more than the predetermined reference value, and the third processing condition in which data is transmitted when the average value of heart rates received for 10 seconds is equal to or more than the predetermined reference value.

When one of the first and second mode conditions and the first to third processing conditions is selected, the first control unit 201 may decide the selected condition as the data transmission condition, and may store the decided data transmission condition in the first memory unit 207. When the portable terminal 101 is requested to enter the sleep mode from the active mode, the first control unit 201 detects the data transmission condition stored in the first memory unit 207 and transmits the detected data transmission condition to the Bluetooth unit 215.

The first control unit 201 receives data from the Bluetooth unit 215 according to the data transmission condition. For example, in the case in which the data transmission condition is the first mode condition, the first control unit 201 may not receive data when the first control unit 201 is in the sleep mode, and may receive data when the first control unit 201 is in the active mode. Then, the first control unit 201 may store the received data in the first memory unit 207, and may processes the data using the application related to the accessory 103. In another example, in the case in which the data transmission condition is the second mode condition, when the first control unit 201 is in the sleep mode, the first control unit 201 may receive data after entering the active mode from the sleep mode. For example, when the accessory 103 is the heart rate monitor, the first control unit 201 may execute the application related to the heart rate and display the heart rate included in data through the executed application.

The Bluetooth unit 215 connects to the accessory 103 through the Bluetooth communication, periodically receives data through the Bluetooth communication, and transmits the data to the first control unit 201 according to the data transmission condition received from the first control unit 201.

In exemplary embodiments, the Bluetooth unit 215 includes a second RF unit 217, a second control unit 219, and a second memory unit 221. The second RF unit 217 includes a wireless transmitter for up-converting and amplifying a frequency of a signal transmitted for the Bluetooth communication, a wireless receiver for low-noise amplifying a received signal and down-converting a frequency of the received signal, or the like. The second memory unit 221 stores an operating system for performing the Bluetooth communication function and various types of data generated during the Bluetooth communication. In exemplary embodiments, the second memory unit 221 stores the data transmission condition received from the first control unit 201 and stores the data received from the accessory 103.

The second control unit 219 performs a function of controlling the overall operation of the Bluetooth unit 215. In exemplary embodiments, the second control unit 219 receives the data transmission condition from the first control unit 201 and stores the received data transmission condition in the second memory unit 221. Then, the second control unit 219 receives the data from the accessory 103. For example, when the accessory 103 is the heart rate monitor, the second control unit 219 may receive data including a heart rate. Then, the second control unit 219 determines whether to transmit the received data to the first control unit 201 based on the stored data transmission condition. As a result of the determination, when the data transmission condition is satisfied, the second control unit 219 transmits the received data to the first control unit 201, and when the data transmission condition is not satisfied, the second control unit 219 does not transmit the received data to the first control unit 201.

In exemplary embodiments, when the data transmission condition is the first mode condition, the second control unit 219 may determine whether the first control unit 201 is in the active mode. As a result of the determination, when the first control unit 201 is in the active mode, the second control unit 219 may transmit the received data to the first control unit 201. In another exemplary embodiment, when the data transmission condition is the second mode condition, the second control unit 219 determines whether the first control unit 201 is in the sleep mode. As a result of the determination, when the first control unit 201 is in the sleep mode, the second control unit 219 may switch the mode of the first control unit 201 to the active mode and transmit the received data to the first control unit 201. In another example, when the accessory 103 transmits data every one second and the data transmission condition is the first processing condition, the second control unit 219 may receive and accumulate data for 10 seconds and transmit the data accumulated every 10 seconds.

In exemplary embodiments, when the accessory 103 is the heart rate monitor and the data transmission condition is the second processing condition, the second control unit 219 compares the heart rate with the predetermined value. As a result of the comparison, when the heart rate is equal to or more than the predetermined value, the second control unit 219 may transmit data including the heart rate to the first control unit 201. In another exemplary embodiment, when the accessory 103 is the heart rate monitor and the data transmission condition is the third processing condition, the second control unit 219 may calculate an average value of heart rates included in data received from the accessory 103 for 10 seconds and may compare the calculated average value with the predetermined value. As a result of the comparison, when the average value is equal to or more than the predetermined value, the second control unit 219 may transmit the received data to the first control unit 201.

Figure 3:
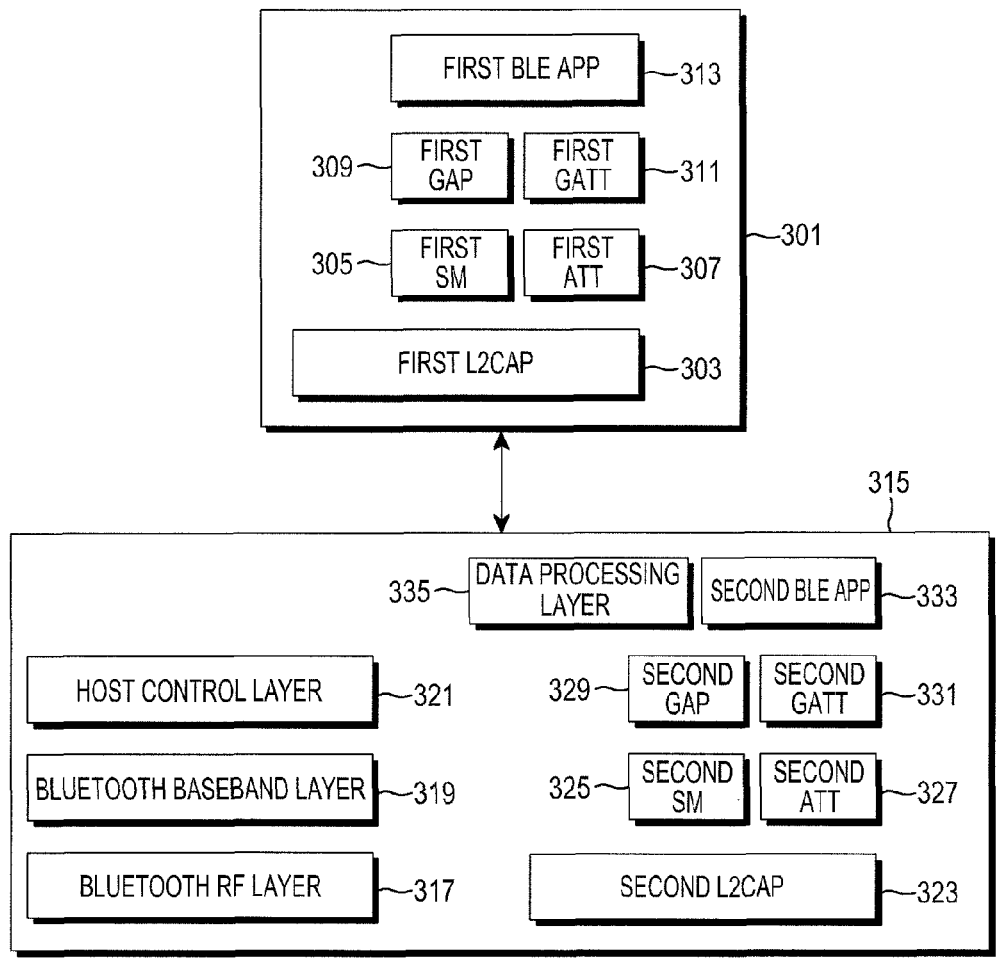
FIG. 3 illustrates a protocol structure of a portable terminal according to the first exemplary embodiment of the present invention.

FIG. 3 illustrates a protocol structure of a portable terminal according to the first exemplary embodiment of the present invention Referring to FIG. 3, a Bluetooth protocol structure 301 of the Bluetooth unit 215 includes a first Logical Link Control and Adaptation Protocol (L2CAP) layer 303, a first Security Manager (SM) layer 305, a first Attribute Protocol (ATT) layer 307, a first Generic Access Profile (GAP) layer 309, a first Generic Attribute Profile (GATT) layer 311, and a first BLE application (BLE App) layer 313.

The first L2CAP layer 303 is a protocol existing in a Bluetooth baseband and a data link layer. The first L2CAP layer 303 provides an upper layer protocol with connection-oriented and connectionless data services through protocol multiplexing, analysis and assembling work, group abstraction, or the like.

The first SM layer 305 is a protocol that manages security between the accessory 103 and the portable terminal 101. The first ATT layer 307 has an attribute handle used when a client access attributes in a server in the case in which communication is performed between the server and the client. The first GAP layer 309 selects a role for communication between low energy devices, controls a multi-profile operation, and may take charge of device search, of connection generation, of a security procedure, or the like. The first GATT layer 311 performs functions of service search, property value detection, reading, writing, or the like.

The first BLE App layer 313 performs a function of controlling a BLE application. The BLE application is an application employing the Bluetooth low energy technology established in the Bluetooth SIG (Special Interest Group). In exemplary embodiments, the first BLE App layer 313 executes the application related to the accessory 103, and outputs a data transmission condition menu when the data transmission condition menu is selected by a user. Then, the first BLE App layer 313 transmits a data transmission condition selected by a user from the output data transmission condition menu to the second control unit 219.

A Bluetooth protocol structure 315 of the second control unit 219 includes a Bluetooth RF layer 317, a Bluetooth baseband layer 319, a host control layer 321, a second L2CAP layer 323, a second SM layer 325, a second ATT layer 327, a second GAP layer 329, a second GATT layer 331, a second BLE App layer 333, and a data processing layer 335.

The Bluetooth RF layer 317 processes a part related to RF for the Bluetooth communication and the Bluetooth baseband layer 319 processes a part related to a baseband for the Bluetooth communication. The host control layer 321 controls communication between the first control unit 201 and the second control unit 219. The communication between the first control unit 201 and the second control unit 219 may be performed using Universal Asynchronous Receiver/Transmitter (UART), using a Universal Serial Bus (USB), or using a wireless connection.

Since the second L2CAP layer 323, the second SM layer 325, the second ATT layer 327, the second GAP layer 329, the second GATT layer 331, and the second BLE App layer 333 perform the same operations as those of the first L2CAP layer 303, the first SM layer 305, the first ATT layer 307, the first GAP layer 309, the first GATT layer 311, and the first BLE App layer 313, a detailed description thereof is omitted herein.

The data processing layer 335 determines whether the data processing condition is satisfied. As a result of the determination, when the data processing condition is satisfied, the data processing layer 335 transmits the data received from the accessory 103 to the first control unit 201, and when the data processing condition is not satisfied, the data processing layer 335 does not transmit the received data.

In exemplary embodiments, when the data transmission condition is the first mode condition, the data processing layer 335 determines whether the first control unit 201 is in the active mode. As a result of the determination, when the first control unit 201 is in the active mode, the data processing layer 335 may transmit the received data to the first control unit 201. In exemplary embodiments, when the data transmission condition is the second mode condition, the data processing layer 335 may determine whether the first control unit 201 is in the sleep mode. As a result of the determination, when the first control unit 201 is in the sleep mode, the data processing layer 335 may switch the mode of the first control unit 201 to the active mode and transmit the received data to the first control unit 201. In another exemplary embodiment, when the accessory 103 transmits data every one second and the data transmission condition is the first processing condition, the data processing layer 335 may receive and accumulate data for 10 seconds and transmit the data accumulated every 10 seconds.

In exemplary embodiments, when the accessory 103 is the heart rate monitor and the data transmission condition is the second processing condition, the data processing layer 335 may compare the heart rate with the predetermined value. As a result of the comparison, when the heart rate is equal to or more than the predetermined value, the data processing layer 335 may transmit data including the heart rate to the first control unit 201. In another exemplary embodiment, when the accessory 103 is the heart rate monitor and the data transmission condition is the third processing condition, the data processing layer 335 may calculate an average value of heart rates included in data received from the accessory 103 for 10 seconds and may compare the calculated average value with the predetermined value. As a result of the comparison, when the average value is equal to or more than the predetermined value, the data processing layer 335 may transmit the received data to the first control unit 201.

Figure 4:
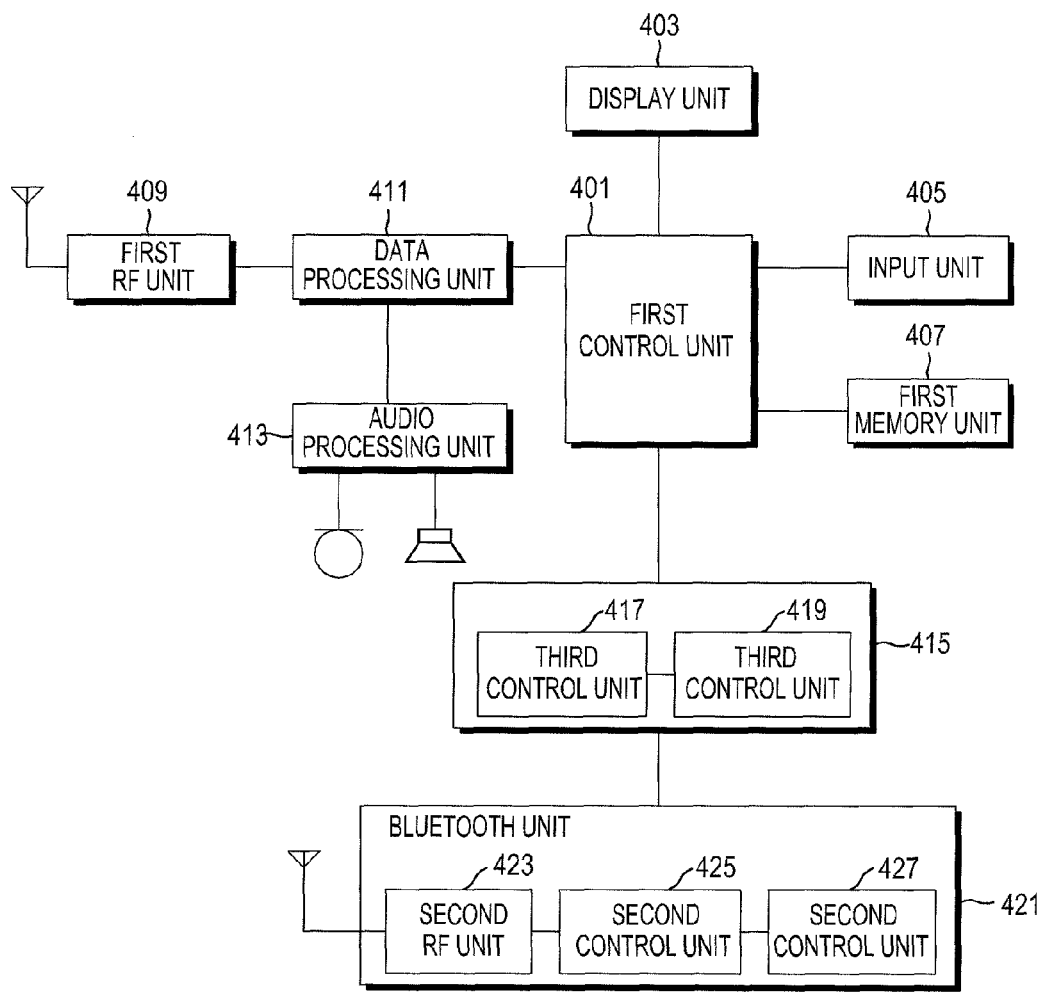
FIG. 4 illustrates a block configuration of a portable terminal according to a second exemplary embodiment of the present invention.

FIG. 4 illustrates a block configuration of a portable terminal according to a second exemplary embodiment of the present invention.

Referring to FIG. 4, the portable terminal 101 includes a first control unit 401, a display unit 403, an input unit 405, a first memory unit 407, a first RF unit 409, a data processing unit 411, an audio processing unit 413, an auxiliary processing unit 415, and a Bluetooth unit 421.

Since the display unit 403, the input unit 405, the first memory unit 407, the first RF unit 409, the data processing unit 411, and the audio processing unit 413 perform the same operations as those of the display unit 203, the input unit 205, the first memory unit 207, the first RF unit 209, the data processing unit 211, and the audio processing unit 213, a detailed description thereof is omitted herein.

The first control unit 401 may control the overall operation of the portable terminal 101. In exemplary embodiments, after the application related to the accessory 103 is executed, the first control unit 401 may determine whether the data transmission condition menu is selected by a user. When the data transmission condition menu is selected, the first control unit 401 may display first and second mode conditions and first to third processing conditions.

In exemplary embodiments, when the accessory 103 is the heart rate monitor, the first control unit 401 may display, on a pop-up window, the first mode condition in which data is transmitted when the first control unit 401 is in the active mode, the second mode condition in which when the first control unit 401 is in the sleep mode, the mode of the first control unit 401 is switched from the sleep mode to the active mode and data is transmitted, the first processing condition in which data is transmitted every 10 seconds, the second processing condition in which data is transmitted when a heart rate is equal to or more than the predetermined reference value, and the third processing condition in which data is transmitted when an average value of heart rates received for 10 seconds is equal to or more than the predetermined reference value.

When one of the first and second mode conditions and the first to third processing conditions is selected, the first control unit 401 may decide the selected condition as the data transmission condition, and may store the decided data transmission condition in the first memory unit 407. When the portable terminal 101 is requested to enter the sleep mode from the active mode, the first control unit 401 may detect the data transmission condition stored in the first memory unit 407, and may transmit the detected data transmission condition to the auxiliary processing unit 415.

The first control unit 401 receives data from the auxiliary processing unit 415 according to the data transmission condition. In exemplary embodiments, in the case in which the data transmission condition is the first mode condition, the first control unit 401 may not receive data when the first control unit 401 is in the sleep mode, and may receive data when the first control unit 401 is in the active mode. Then, the first control unit 401 may store the received data in the first memory unit 407, and may process the data using the application related to the accessory 103. In another exemplary embodiment, in the case in which the data transmission condition is the second mode condition, when the first control unit 401 is in the sleep mode, the first control unit 401 may receive data after entering the active mode from the sleep mode. For example, when the accessory 103 is the heart rate monitor, the first control unit 401 may execute the application related to the heart rate and display the heart rate included in data through the executed application.

The Bluetooth unit 421 includes a second RF unit 423, a second control unit 425, and a second memory unit 427. The second RF unit 423 includes a wireless transmitter for up-converting and amplifying a frequency of a signal transmitted for the Bluetooth communication, a wireless receiver for low-noise amplifying a received signal and down-converting a frequency of the received signal, or the like. The second memory unit 427 stores an operating system for performing the Bluetooth communication function and various types of data generated during the Bluetooth communication. The second control unit 425 may control the overall operation of the Bluetooth unit 421. In exemplary embodiments, the second control unit 425 receives data from the accessory 103 and transmits the received data to the auxiliary processing unit 415.

The auxiliary processing unit 415 includes a third control unit 417 and a third memory unit 419. The third memory unit 419 stores the data received from the first control unit 401 or the data received from the Bluetooth unit 421. In exemplary embodiments, the third memory unit 419 stores the data transmission condition received from the first control unit 401.

The third control unit 417 determines whether to transmit the data received from the Bluetooth unit 421 to the first control unit 401 based on the stored data transmission condition. As a result of the determination, when the data transmission condition is satisfied, the third control unit 417 may transmit the received data to the first control unit 401, and when the data transmission condition is not satisfied, the third control unit 417 may not transmit the received data to the first control unit 401.

In exemplary embodiments, when the data transmission condition is the first mode condition, the third control unit 417 determines whether the first control unit 401 is in the active mode. As a result of the determination, when the first control unit 401 is in the active mode, the third control unit 417 may transmit the received data to the first control unit 401. In another exemplary embodiment, when the data transmission condition is the second mode condition, the third control unit 417 may determine whether the first control unit 401 is in the sleep mode. As a result of the determination, when the first control unit 401 is in the sleep mode, the third control unit 417 may switch the mode of the first control unit 401 to the active mode and transmit the received data to the first control unit 401. In another exemplary embodiment, when the accessory 103 transmits data every one second and the data transmission condition is the first processing condition, the third control unit 417 may receive and accumulate data for 10 seconds and transmit the data accumulated every 10 seconds.

In exemplary embodiments, when the accessory 103 is a heart rate monitor and the data transmission condition is the second processing condition, the third control unit 417 compares a heart rate with the predetermined value. As a result of the comparison, when the heart rate is equal to or more than the predetermined value, the third control unit 417 may transmit data including the heart rate to the first control unit 401. In another exemplary embodiment, when the accessory 103 is the heart rate monitor and the data transmission condition is the third processing condition, the third control unit 417 may calculate an average value of heart rates included in data received from the accessory 103 for 10 seconds and may compare the calculated average value with the predetermined value. As a result of the comparison, when the average value is equal to or more than the predetermined value, the third control unit 417 may transmit the received data to the first control unit 401.

Figure 5:
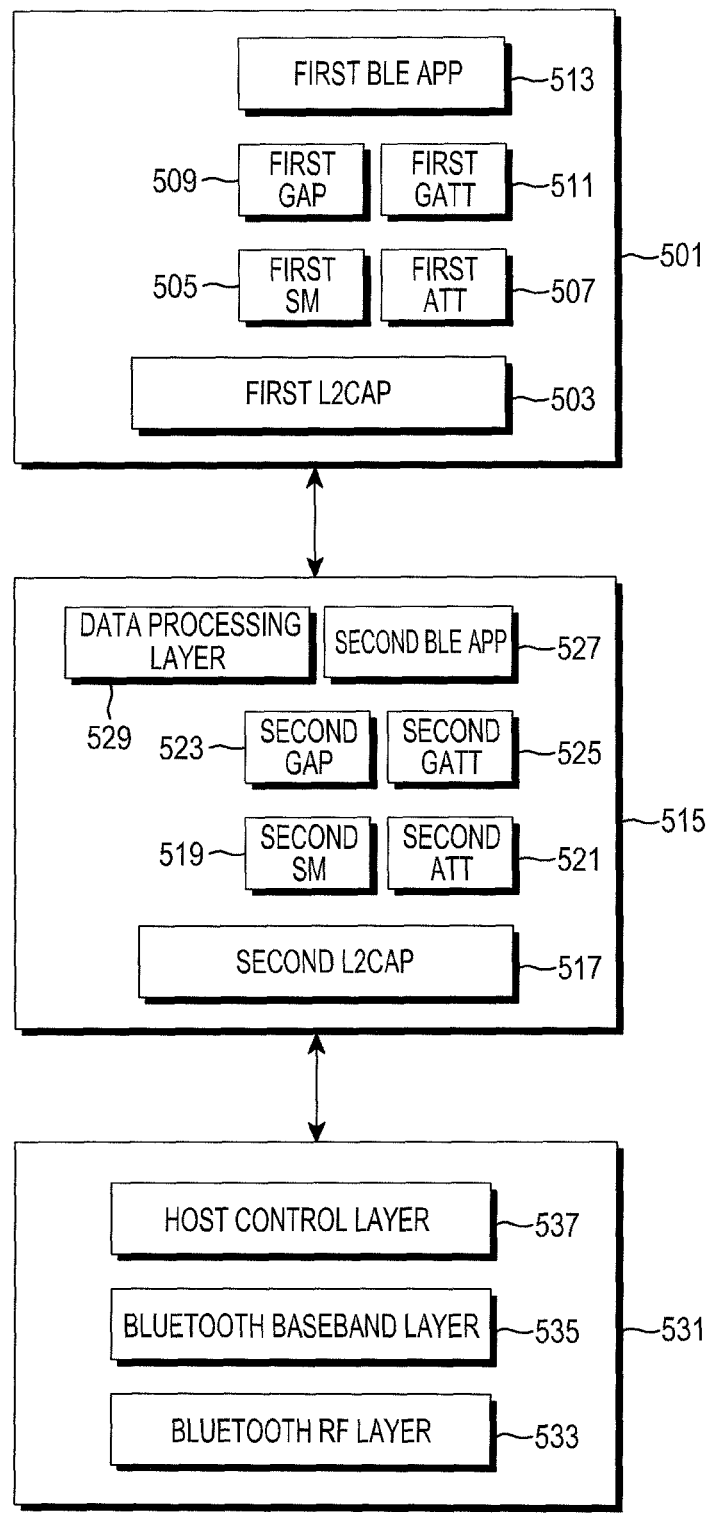
FIG. 5 illustrates a protocol structure of a portable terminal according to the second exemplary embodiment of the present invention.

FIG. 5 illustrates a protocol structure of a portable terminal according to the second exemplary embodiment of the present invention Referring to FIG. 5, a Bluetooth protocol structure 501 of the first control unit 401 includes a first L2CAP layer 503, a first SM layer 505, a first ATT layer 507, a first GAP layer 509, a first GATT layer 511, and a first BLE App layer 513.

Since the first L2CAP layer 503, the first SM layer 505, the first ATT layer 507, the first GAP layer 509, the first GATT layer 511, and the first BLE App layer 513 perform the same operations as those of the first L2CAP layer 303, the first SM layer 305, the first ATT layer 307, the first GAP layer 309, the first GATT layer 311, and the first BLE App layer 313, a detailed description thereof is omitted herein.

A Bluetooth protocol structure 531 of the Bluetooth unit 421 includes a Bluetooth RF layer 533, a Bluetooth baseband layer 535, and host control layer 537. Since the Bluetooth RF layer 533, a Bluetooth baseband layer 535, and host control layer 537 perform the same operations as those of the Bluetooth RF layer 317, the Bluetooth baseband layer 319, and the host control layer 321, a detailed description thereof is omitted herein.

A Bluetooth protocol structure 515 of the auxiliary processing unit 415 includes a second L2CAP layer 517, a second SM layer 519, a second ATT layer 521, a second GAP layer 523, a second GATT layer 525, a second BLE App layer 527, and a data processing layer 529. Since the second L2CAP layer 517, the second SM layer 519, the second ATT layer 521, the second GAP layer 523, the second GATT layer 525, and the second BLE App layer 527 perform the same operations as those of the first L2CAP layer 503, the first SM layer 505, the first ATT layer 507, the first GAP layer 509, the first GATT layer 511, and the first BLE App layer 513, a detailed description thereof is omitted herein.

The data processing layer 529 determines whether the data processing condition is satisfied. As a result of the determination, when the data processing condition is satisfied, the data processing layer 529 may transmit the data received from the Bluetooth unit 421 to the first control unit 401, and when the data processing condition is not satisfied, the data processing layer 529 may not transmit the received data.

In exemplary embodiments, when the data transmission condition is the first mode condition, the data processing layer 529 may determine whether the first control unit 401 is in the active mode. As a result of the determination, when the first control unit 401 is in the active mode, the data processing layer 529 may transmit the received data to the first control unit 401. In another example, when the data transmission condition is the second mode condition, the data processing layer 529 may determine whether the first control unit 401 is in the sleep mode. As a result of the determination, when the first control unit 401 is in the sleep mode, the data processing layer 529 may switch the mode of the first control unit 401 to the active mode and transmit the received data to the first control unit 401. In another exemplary embodiment, when the accessory 103 transmits data every one second and the data transmission condition is the first processing condition, the data processing layer 529 may receive and accumulate data for 10 seconds and transmit the data accumulated every 10 seconds.

In exemplary embodiments, when the accessory 103 is the heart rate monitor and the data transmission condition is the second processing condition, the data processing layer 529 may compare a heart rate with the predetermined value. As a result of the comparison, when the heart rate is equal to or more than the predetermined value, the data processing layer 529 may transmit data including the heart rate to the first control unit 401. In another exemplary embodiment, when the accessory 103 is the heart rate monitor and the data transmission condition is the third processing condition, the data processing layer 529 may calculate an average value of heart rates included in data received from the accessory 103 for 10 seconds and may compare the calculated average value with the predetermined value. As a result of the comparison, when the average value is equal to or more than the predetermined value, the data processing layer 529 may transmit the received data to the first control unit 401.

Figure 6:
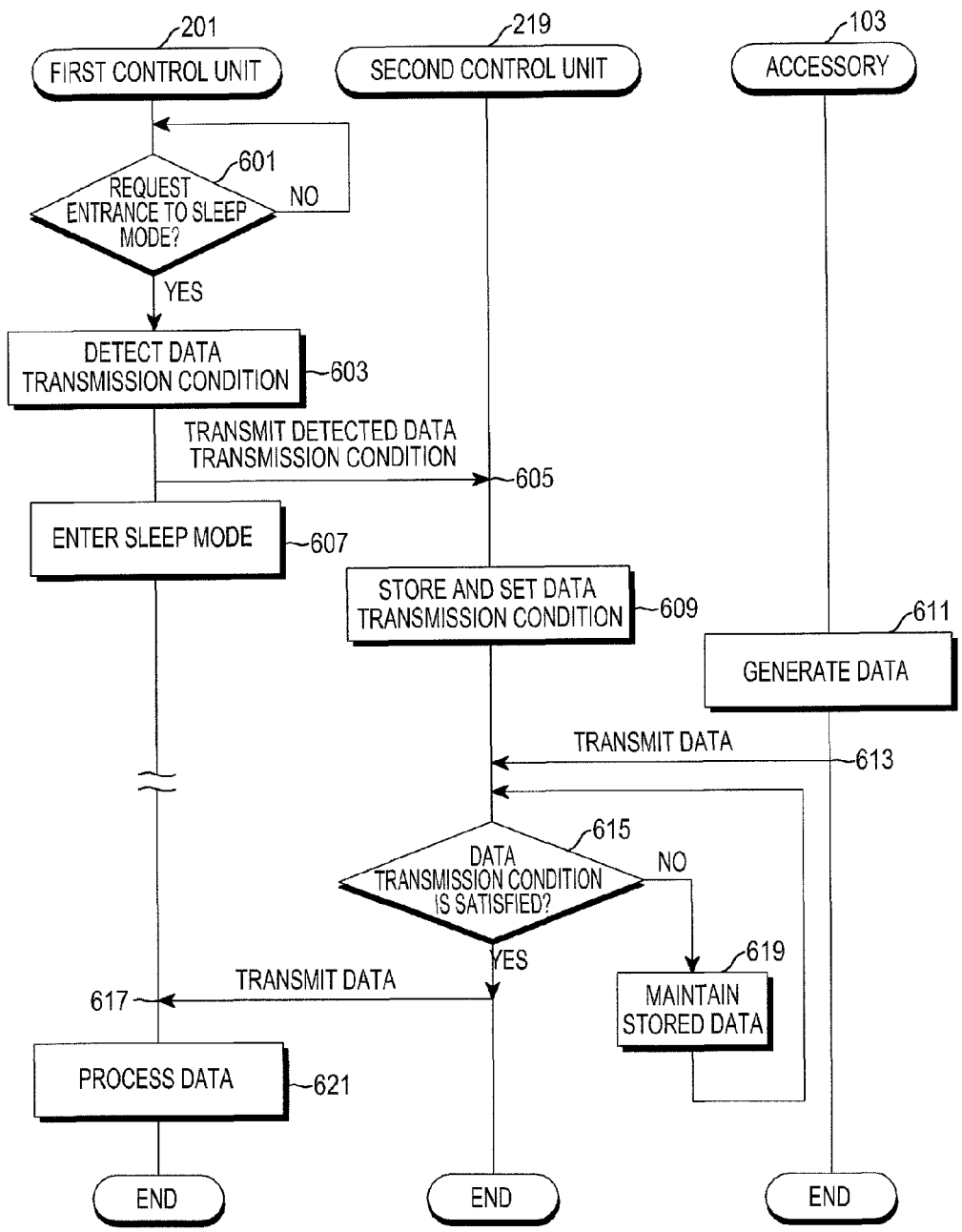
FIG. 6 is a flowchart illustrating a process in which a portable terminal according to the first exemplary embodiment of the present invention processes data.

FIG. 6 is a flowchart illustrating a process in which a portable terminal according to the first exemplary embodiment of the present invention processes data.

Referring to FIG. 6, in step S601, the first control unit 201 of the portable terminal 101 determines whether the portable terminal 101 is requested to enter the sleep mode from the active mode by a user or a predetermined condition. When a button for requesting the entrance to the sleep mode is selected by the user, the first control unit 201 may determine that the entrance to the sleep mode is requested. Also, when no request is input by the user for a predetermined time, the first control unit 201 may determine that the entrance to the sleep mode is requested. As a result of the determination, when the entrance to the sleep mode is requested, the first control unit 201 proceeds to step S603, and when the entrance to the sleep mode is not requested, the first control unit 201 repeatedly performs step S601.

In step S603, the first control unit 201 detects a data transmission condition from the first memory unit 207, and proceeds to step S605. The data transmission condition is a condition in which the second control unit 219 transmits the data received from the accessory 103.

In exemplary embodiments, the data transmission condition includes the mode condition and the data processing condition of the first control unit 201. The mode condition of the first control unit 201 is a condition for transmitting data based on the mode of the first control unit 201. The mode condition of the first control unit 201 may include the first mode condition in which data is transmitted when the first control unit 201 is in the active mode and the second mode condition in which data is transmitted when the first control unit 201 is in the random mode regardless of the mode of the first control unit 201.

The data processing condition is a condition in which data is transmitted based on the transmission interval of data received from the accessory 103 and information included in the data. The data processing condition may include at least one of the first processing condition in which accumulated data is transmitted at a predetermined transmission interval, the second processing condition in which data is transmitted when the information included in the data satisfies a predetermined condition, and the third processing condition obtained by combining the first processing condition with the second processing condition.

The first control unit 201 transmits the detected data transmission condition to the second control unit 219 in step S605, and enters to the sleep mode from the active mode in step S607, and the procedure proceeds to step S609.

In step S609, the second control unit 219 stores the data transmission condition received from the first control unit 201 in the second memory unit 221, sets the stored data transmission condition as a data transmission condition in which the Bluetooth unit 215 transmits the data received from the accessory 103 to the first control unit 201, and the procedure proceeds to step S611.

The accessory 103 connects to the portable terminal 101 through the Bluetooth communication and generates data related to the accessory 103 in step S611, transmits the generated data to the Bluetooth unit 215 through the Bluetooth communication in step S613, and the procedure proceeds to step S615. The accessory 103 may include a heart rate monitor, a blood glucose monitor, a thermometer, an electrocardiogram meter, a pedometer, a smart phone having a temperature sensor or a barometer therein, or the like. When the accessory 103 is the heart rate monitor, the accessory 103 may measure a heart rate of a user to generate data including the measured heart rate, and transmit the generated data to the Bluetooth unit 215. When the portable terminal 101 connects to the accessory 103 through the Bluetooth communication in step S601, it may be possible to omit the operation in which the accessory 103 connects to the portable terminal 101 through the Bluetooth communication.

In step S615, the second control unit 219 stores the data received from the accessory 103 in the second memory unit 221 and determines whether a preset data transmission condition is satisfied. When the preset data transmission condition is satisfied, the second control unit 219 proceeds to step S617, and when the preset data transmission condition is not satisfied, the second control unit 219 proceeds to step S619.

In step S619, the second control unit 219 maintains the stored data without transmitting the data to the first control unit 201, and proceeds to step S615.

Meanwhile, in step S617, the second control unit 219 transmits the stored data to the first control unit 201. Then, the second control unit 219 may delete the transmitted data of the data stored in the second memory unit 221.

In exemplary embodiments, when the data transmission condition is the first mode condition in which data is transmitted when the first control unit 201 is in the active mode, the second control unit 219 may determine whether the first control unit 201 is in the active mode. As a result of the determination, when the first control unit 201 is in the active mode, the second control unit 219 may transmit the received data to the first control unit 201. In another exemplary embodiment, when the data transmission condition is the second mode condition, the second control unit 219 may determine whether the first control unit 201 is in the sleep mode. As a result of the determination, when the first control unit 201 is in the sleep mode, the second control unit 219 may switch the mode of the first control unit 201 to the active mode and transmit the received data to the first control unit 201. In another exemplary embodiment, when the accessory 103 transmits data every one second and the data transmission condition is the first processing condition in which data is transmitted every 10 seconds, the second control unit 219 may receive data for 10 seconds from the accessory 103, accumulate the received data, and transmit the accumulated data every 10 seconds.

In exemplary embodiments, when the accessory 103 is the heart rate monitor and the data transmission condition is the second processing condition in which data is transmitted when a heart rate included in the data is equal to or more than the predetermined reference value (for example, 120), the second control unit 219 may compare the heart rate with the predetermined value. As a result of the comparison, when the heart rate is equal to or more than the predetermined value, the second control unit 219 may transmit data including the heart rate to the first control unit 201.

In exemplary embodiments, when the accessory 103 is the heart rate monitor and the data transmission condition is the third processing condition in which data is transmitted when an average value of heart rates received from the accessory 103 for 10 seconds is equal to or more than the predetermined reference value (for example, 120), the second control unit 219 may calculate an average value of heart rates included in data received from the accessory 103 for 10 seconds and may compare the calculated average value with the predetermined value. As a result of the comparison, when the average value is equal to or more than the predetermined value, the second control unit 219 may transmit the received data to the first control unit 201.

In step S621, the first control unit 201 receives data from the second control unit 219, stores the received data in the first memory unit 207, and processes the stored data using an application related to the received data. For example, when the accessory 103 is the heart rate monitor, the first control unit 201 may execute an application related to the heart rate and display the heart rate included in the data through the executed application.

Figure 7:
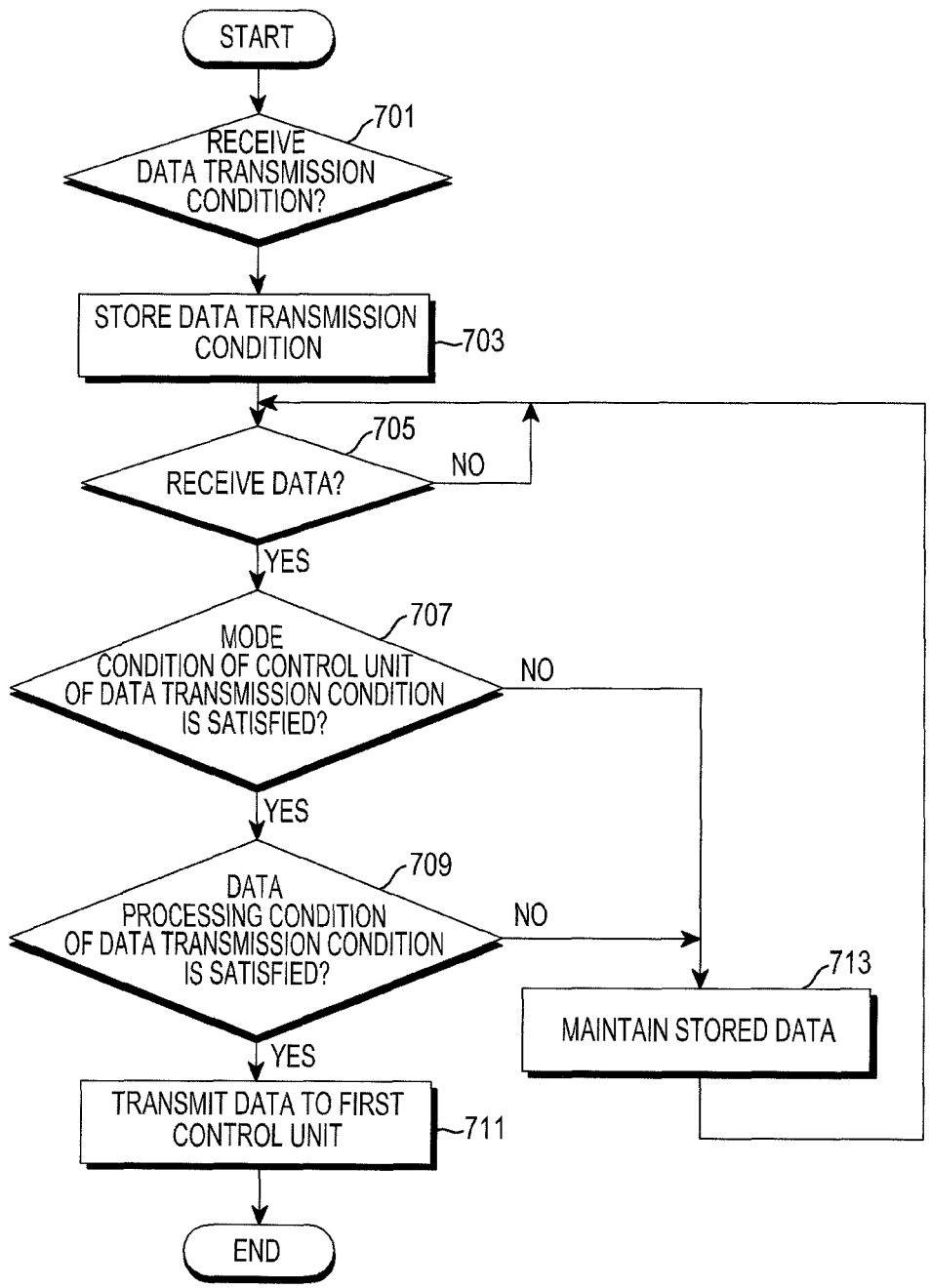
FIG. 7 is a flowchart illustrating a process in which a Bluetooth unit according to the first exemplary embodiment of the present invention processes data.

FIG. 7 is a flowchart illustrating a process in which a Bluetooth unit according to the first exemplary embodiment of the present invention processes data.

Referring to FIG. 7, in step S701, the second control unit 219 of the Bluetooth unit 215 determines whether a data transmission condition is received from the first control unit 201. As a result of the determination, when the data transmission condition is received, the second control unit 219 proceeds to step S703, and when the data transmission condition is not received, the Bluetooth unit 215 repeatedly performs step S701.

In step S703, the second control unit 219 stores the data transmission condition received from the first control unit 201 in the second memory unit 221, sets the stored data transmission condition as a data transmission condition in which the Bluetooth unit 215 transmits the data received from the accessory 103 to the first control unit 201, and proceeds to step S705.

In step S705, the second control unit 219 connects to the accessory 103 through the Bluetooth communication, and determines whether data is received from the accessory 103. As a result of the determination, when the data is received, the second control unit 219 proceeds to step S707, and when the data is not received, the second control unit 219 repeatedly performs step S705.

In step S707, the second control unit 219 stores the data transmitted from the accessory 103 in the second memory unit 221 and determines whether the mode condition of the first control unit 201 of the data transmission condition is satisfied. The mode condition of the first control unit 201 is a condition in which data is transmitted based on the mode of the first control unit 201. The mode condition of the first control unit 201 may include the first mode condition in which data is transmitted when the first control unit 201 is in the active mode, and the second mode condition in which when the first control unit 201 is in the sleep mode, the mode of the first control unit 201 is switched from the sleep mode to the active mode and data is transmitted.

As a result of the determination, when the mode condition of the first control unit 201 is satisfied, the second control unit 219 proceeds to step S709, and when the mode condition of the first control unit 201 is not satisfied, the second control unit 219 proceeds to step S713. For example, when the mode condition of the first control unit 201 is the first mode condition, the second control unit 219 determines whether the first control unit 201 is in the active mode. As a result of the determination, when the first control unit 201 is in the active mode, the second control unit 219 may proceed to step S709.

In step S709, the second control unit 219 determines whether the data processing condition of the data condition is satisfied. The data processing condition is a condition in which data is transmitted based on the transmission interval of data received from the accessory 103 and information included in the data. The data processing condition may include at least one of the first processing condition in which accumulated data is transmitted at a predetermined transmission interval, the second processing condition in which Bluetooth data is transmitted when the information included in the data satisfies a predetermined reference, and the third processing condition obtained by combining the first processing condition with the second processing condition.

As a result of the determination, when the data processing condition is satisfied, the second control unit 219 proceeds to step S711, and when the data processing condition is not satisfied, the second control unit 219 proceeds to step S713. In step S713, the second control unit 219 maintains the stored data without transmitting the data to the first control unit 201, and proceeds to step S705.

In step S711, the second control unit 219 transmits the data to the first control unit 201. For example, when the accessory 103 transmits data every one second and the data transmission condition is the first processing condition in which data is transmitted every 10 seconds, the second control unit 219 may receive data from the accessory 103 for 10 seconds, accumulate the received data, and transmit the accumulated data every 10 seconds.

In exemplary embodiments, when the accessory 103 is the heart rate monitor and the data transmission condition is the second processing condition in which data is transmitted when a heart rate included in the data is equal to or more than the predetermined reference value (for example, 120), the second control unit 219 may compare the heart rate with the predetermined value. As a result of the comparison, when the heart rate is equal to or more than the predetermined value, the second control unit 219 may transmit data including the heart rate to the first control unit 201.

In exemplary embodiments, when the accessory 103 is the heart rate monitor and the data transmission condition is the third processing condition in which data is transmitted when an average value of heart rates received from the accessory 103 for 10 seconds is equal to or more than the predetermined reference value (for example, 120), the second control unit 219 may calculate an average value of heart rates included in data received from the accessory 103 for 10 seconds and may compare the calculated average value with the predetermined value. As a result of the comparison, when the average value is equal to or more than the predetermined value, the second control unit 219 may transmit the received data to the first control unit 201.

Figure 8:
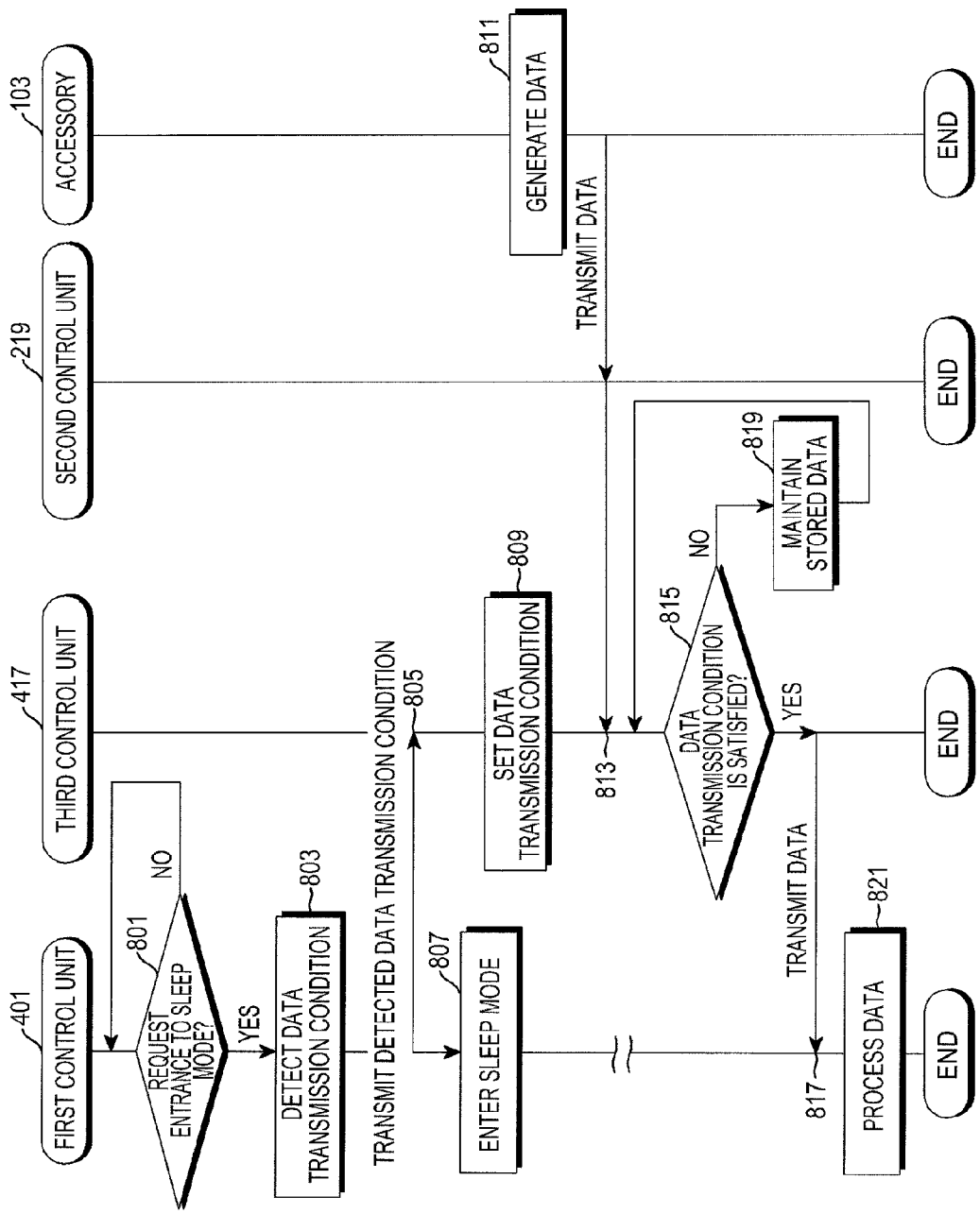
FIG. 8 is a flowchart illustrating a process in which a portable terminal according to the second exemplary embodiment of the present invention processes data.

FIG. 8 is a flowchart illustrating a process in which a portable terminal according to the second exemplary embodiment of the present invention processes data.

Referring to FIG. 8, in step S801, the first control unit 401 of the portable terminal 101 determines whether the portable terminal 101 is requested to enter the sleep mode from the active mode by a user or a predetermined condition. When a button for requesting the entrance to the sleep mode is selected by the user, the first control unit 401 determines that the entrance to the sleep mode is requested. Also, when no request is input by the user for a predetermined time, the first control unit 401 determines that the entrance to the sleep mode is requested. As a result of the determination, when the entrance to the sleep mode is requested, the first control unit 401 proceeds to step S803, and when the entrance to the sleep mode is not requested, the first control unit 401 repeatedly performs step S401.

In step S803, the first control unit 401 detects a data transmission condition from the first memory unit 407, and proceeds to step S805. The data transmission condition is a condition in which the third control unit 417 transmits the data received from the accessory 103.

In exemplary embodiments, the data transmission condition includes the mode condition and the data processing condition of the first control unit 401. The mode condition of the first control unit 401 is a condition for transmitting data based on the mode of the first control unit 401. The mode condition of the first control unit 401 may include the first mode condition in which data is transmitted when the first control unit 401 is in the active mode, and the second mode condition in which when the first control unit 401 is in a sleep mode. When the mode of the first control unit 401 is switched from the sleep mode to the active mode data is transmitted.

The data processing condition is a condition in which data is transmitted based on the transmission interval of data received from the accessory 103 and information included in the data. The data processing condition may include at least one of the first processing condition in which accumulated data is transmitted at a predetermined transmission interval, the second processing condition in which data is transmitted when the information included in the data satisfies a predetermined condition, and the third processing condition obtained by combining the first processing condition with the second processing condition.

The first control unit 401 transmits the detected data transmission condition to the third control unit 417 in step S805, and enters to the sleep mode from the active mode in step S807, and the procedure proceeds to step S809.

In step S809, the third control unit 417 stores the data transmission condition received from the first control unit 401 in the third memory unit 419, sets the stored data transmission condition as a data transmission condition in which the auxiliary processing unit 415 transmits the data received from the Bluetooth unit 421 to the first control unit 401, and the procedure proceeds to step S811.

The accessory 103 connects to the portable terminal 101 through the Bluetooth communication and generates data related to the accessory 103 in step S811 and transmits the generated data to the Bluetooth unit 421 through the Bluetooth communication in step S813, the Bluetooth unit 421 transmits (e.g., via the second control unit 219) the received data to the third control unit 417, and the procedure proceeds to step S815. The accessory 103 may include a heart rate monitor, a blood glucose monitor, a thermometer, an electrocardiogram meter, a pedometer, a smart phone having a temperature sensor or a barometer therein, or the like. When the accessory 103 is the heart rate monitor, the accessory 103 may measure a heart rate of a user to generate data including the measured heart rate, and transmit the generated data to the Bluetooth unit 421.

In step S815, the third control unit 417 stores the data received from the accessory 103 in the third memory unit 419, and determines whether a preset data transmission condition is satisfied. When the preset data transmission condition is satisfied, the third control unit 417 proceeds to step S817, and when the preset data transmission condition is not satisfied, the third control unit 417 proceeds to step S819.

In step S819, the third control unit 417 maintains the stored data without transmitting the data to the first control unit 201, and proceeds to step S815.

In step S817, the third control unit 417 transmits the stored data to the first control unit 401. Then, the third control unit 417 may delete the transmitted data of the data stored in the third memory unit 419.

In exemplary embodiments, when the data transmission condition is the first mode condition in which data is transmitted when the first control unit 401 is in the active mode, the third control unit 417 may determine whether the first control unit 401 is in the active mode. As a result of the determination, when the first control unit 401 is in the active mode, the third control unit 417 may transmit the received data to the first control unit 201. In another example, when the data transmission condition is the second mode condition, the third control unit 417 may determine whether the first control unit 401 is in the sleep mode. As a result of the determination, when the first control unit 401 is in the sleep mode, the third control unit 417 may switch the mode of the first control unit 401 to the active mode and transmit the received data to the first control unit 401. In another exemplary embodiment, when the accessory 103 transmits data every one second and the data transmission condition is the first processing condition in which data is transmitted every 10 seconds, the third control unit 417 may receive data from the accessory 103 for 10 seconds, accumulate the received data, and transmit the accumulated data every 10 seconds.

In exemplary embodiments, when the accessory 103 is the heart rate monitor and the data transmission condition is the second processing condition in which data is transmitted when a heart rate included in the data is equal to or more than the predetermined reference value (for example, 120), the third control unit 417 may compare the heart rate with the predetermined value. As a result of the comparison, when the heart rate is equal to or more than the predetermined value, the third control unit 417 may transmit data including the heart rate to the first control unit 401.

In exemplary embodiments, when the accessory 103 is the heart rate monitor and the data transmission condition is the third processing condition in which data is transmitted when an average value of heart rates received from the accessory 103 for 10 seconds is equal to or more than the predetermined reference value (for example, 120), the third control unit 417 may calculate an average value of heart rates included in data received from the accessory 103 for 10 seconds and may compare the calculated average value with the predetermined value. As a result of the comparison, when the average value is equal to or more than the predetermined value, the third control unit 417 may transmit the received data to the first control unit 401.

In step S821, the first control unit 401 receives data from the third control unit 417, stores the received data in the first memory unit 407, and processes the stored data using an application related to the received data. For example, when the accessory 103 is the heart rate monitor, the first control unit 401 may execute an application related to the heart rate and display the heart rate included in the data through the executed application.

Through the above configuration and operations, exemplary embodiments of the present invention may provide an effect in which when the portable terminal processes Bluetooth data, the auxiliary control unit (the second control unit or the third control unit) transmits data received from the accessory to the control unit according to a predetermined data transmission condition during Bluetooth communication, so that current consumption of the control unit for data processing is minimized.

The apparatus and the method for processing Bluetooth data in the portable terminal of exemplary embodiments of the present invention may be achieved in a computer-readable recording medium as computer-readable codes. The computer-readable recording medium includes all kinds of recording devices for storing data readable by a computer system. The recording medium, for example, includes ROM, RAM, an optical disk, a magnet tape, a floppy disk, a hard disk, a nonvolatile memory or the like, and also includes a medium prepared in the form of a carrier wave (for example, transmission through the Internet). Furthermore, the computer-readable recording medium may be distributed to computer systems connected to one another through a network, and computer-readable codes may be stored and executed in a distribution scheme. Also, functional programs, code, and code segments for accomplishing the present invention can be easily construed by programmers skilled in the art to which the present invention pertains.

While the invention has been shown and described with reference to certain embodiments thereof, it will be understood by those skilled in the art that various changes in form and details may be made therein without departing from the spirit and scope of the present invention as defined by the appended claims and their equivalents.

What is claimed is:

1. An apparatus for processing Bluetooth data in a portable terminal, the apparatus comprising:
a memory configured to store data transmission condition;
a first processor; and
a second processor configured to:
determine, when data is directly received from an accessory through Bluetooth communication, whether the data transmission condition is satisfied based on a result of comparing biometric information included in the received data with a predetermined value included in the data transmission condition,
transmit the received data to the first processor when the data transmission condition is satisfied as a result of the determination, and
store the received data to the memory when the data transmission condition is not satisfied as the result of the determination,
wherein the biometric information is measured by the accessory.

2. The apparatus of claim 1, wherein the data transmission condition includes a mode condition of the first processor in which the data is transmitted based on a mode of the first processor and the data processing condition in which the data is transmitted based on a transmission interval of the received data and the information included in the received data.

3. The apparatus of claim 2, wherein the mode condition of the first processor includes one of a first mode condition in which the data is transmitted when the first processor is in an active mode and a second mode condition in which, when the first processor is in a sleep mode, the mode of the first processor is switched from the sleep mode to the active mode and the data is transmitted.

4. The apparatus of claim 2, wherein the data processing condition includes one of a first processing condition in which accumulated data is transmitted at a predetermined transmission interval, a second processing condition in which the data is transmitted when the information included in the data satisfies a predetermined reference and a third processing condition obtained by combining the first processing condition with the second processing condition.

5. The apparatus of claim 1, wherein the second processor is included in a Bluetooth unit that controls the Bluetooth communication.

6. The apparatus of claim 5, wherein a protocol structure of the second processor includes a Bluetooth Radio Frequency (RF) layer, a Bluetooth baseband layer, a host control layer, a logical link control and adaptation protocol layer, a security manager layer, an attribute protocol layer, a generic access profile layer, a generic attribute profile layer, a Bluetooth low energy application layer, and a data processing layer for determining whether the data processing condition is satisfied.

7. The apparatus of claim 1, wherein the second processor is included in an auxiliary processing device.

8. The apparatus of claim 7, wherein a protocol structure of the second processor includes a logical link control and adaptation protocol layer, a security manager layer, an attribute protocol layer, a generic access profile layer, a generic attribute profile layer, a Bluetooth low energy application layer, and a data processing layer for determining whether the data processing condition is satisfied.

9. The apparatus of claim 1, wherein the accessory is a heart rate monitor.

10. A method for processing Bluetooth data in a portable terminal, the method comprising:
storing, by a second processor, the data transmission condition in a memory;
determining, by the second processor when data is directly received from an accessory through Bluetooth communication, whether the data transmission condition is satisfied based on a result of comparing biometric information included in the received data with a predetermined value included in the data transmission condition;
transmitting, by the second processor, the received data to a first processor when the data transmission condition is satisfied as a result of the determination; and
storing, by the second processor, the received data to the memory when the data transmission condition is not satisfied as the result of the determination,
wherein the biometric information is measured by the accessory.

11. The method of claim 10, wherein the data transmission condition includes a mode condition of the first processor in which the data is transmitted based on a mode of the first processor and the data processing condition in which the data is transmitted based on a transmission interval of the received data and on the information included in the received data.

12. The method of claim 11, wherein the mode condition of the first processor includes one of a first mode condition in which the data is transmitted when the first processor is in an active mode and a second mode condition in which, when the first processor is in a sleep mode, the mode of the first processor is switched from the sleep mode to the active mode and the data is transmitted.

13. The method of claim 11, wherein the data processing condition includes one of a first processing condition in which accumulated data is transmitted at a predetermined transmission interval, a second processing condition in which the data is transmitted when the information included in the data satisfies a predetermined reference, and a third processing condition obtained by combining the first processing condition with the second processing condition.

14. The method of claim 10, wherein the second processor is included in a Bluetooth unit that controls the Bluetooth communication.

15. The method of claim 14, wherein a protocol structure of the second processor includes a Bluetooth Radio Frequency (RF) layer, a Bluetooth baseband layer, a host control layer, a logical link control and adaptation protocol layer, a security manager layer, an attribute protocol layer, a generic access profile layer, a generic attribute profile layer, a Bluetooth low energy application layer, and a data processing layer for determining whether the data processing condition is satisfied.

16. The method of claim 10, wherein the second processor is included in an auxiliary processing device.

17. The method of claim 16, wherein a protocol structure of the second processor includes a logical link control and adaptation protocol layer, a security manager layer, an attribute protocol layer, a generic access profile layer, a generic attribute profile layer, a Bluetooth low energy application layer, and a data processing layer for determining whether the data processing condition is satisfied.

18. The method of claim 10, wherein the accessory is a heart rate monitor.

19. At least one non-transitory processor readable medium for storing a computer program of instructions configured to be readable by at least one processor for instructing the at least one processor to execute a computer process for performing the method as recited in claim 10.

* * * * *